Dec. 20, 1938.  C. W. KANOLT  2,140,702

STEREOSCOPIC PICTURE

Filed Aug. 31, 1934

Inventor
Clarence W. Kanolt
By Penrose E. Hodges
Attorney

Patented Dec. 20, 1938

2,140,702

UNITED STATES PATENT OFFICE 2,140,702

STEREOSCOPIC PICTURE

Clarence W. Kanolt, Long Island City, N. Y.

Application August 31, 1934, Serial No. 742,304

7 Claims. (Cl. 88—29)

This invention relates to improved stereoscopic pictures of the Depthograph type which are made in accordance with the inventions set forth in my prior Patent Nos. 1,150,374, granted August 17, 1915, and 1,260,682, granted March 26, 1918. Stereoscopic pictures made in accordance with those patents consist of strip images of an object taken from successively changing points of view. The strip images of the object as seen from one point of view are interlineated with the strip images of the object from the other points of view. Usually the strip images are infinite in number, representing a continuously changing point of view. I have designated such pictures "Depthographs", this being a trade-name and protected as a trade-mark by certificate of registration No. 261,335, issued September 17, 1929.

Depthographs have been heretofore produced of the character shown in Figs. 6 and 7 of my Patent No. 1,822,489, granted September 8, 1931, each consisting of a ribbed sheet of transparent material, such as a cellulose ester or ether with a Depthograph picture produced photographically on the surface opposite the ribs, and with its picture strips in registry with the ribs. The thickness of the material is such that the picture is approximately in the focal plane of the cylindrical lens formed by the ribs.

The ribbed sheet constitutes a lineating screen because, if placed with its flat side adjacent a surface, it renders visible from a given direction only certain linear elements of the surface, or if parallel rays of light fall upon the ribbed side of the screen they reach only such linear elements of the surface.

Depthographs made in this way present three difficulties:

First: A Depthograph made by the use of plastic material is likely to warp in time, especially if subjected to the heat from a lamp used to illuminate it. It has not been found possible to make the transparent plate entirely of glass and produce on it ribs of sufficiently accurate form when the ribs need to be fine.

Second: The thickness of the plastic material required is sufficient to present a large item of cost.

Third: By methods previously employed, the accurate registration of the picture strips with the ribs must be secured when the image is being printed in the dim light of a photographic darkroom. It is preferable that registration be accomplished in daylight.

An object of this invention is to successfully overcome these three difficulties just enumerated and to improve the character of lineating screen used and thereby improve the Depthograph.

According to a preferred embodiment of my invention, instead of forming lenticulations on a relatively thick sheet of plastic material, I form lenticulations on a relatively thin sheet of plastic material and adhesively secure this lenticulated sheet to a rigid sheet of transparent material, such, for instance, as glass, which rigid sheet has adjacent its back surface the photographic emulsion carrying the picture strips of the kind present in the usual Depthograph picture.

This embodiment of the invention, together with modifications thereof, is illustrated in the accompanying drawing, in which.

Figure 1:
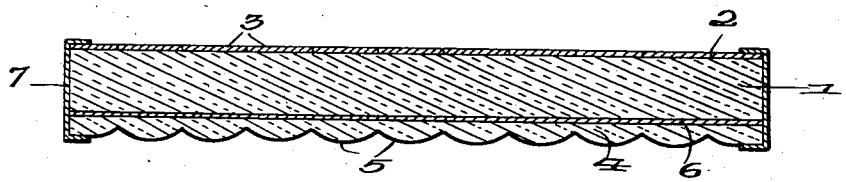
Fig. 1 is a sectional view showing one form of my invention adapted for exhibition by transmitted light.

In the illustrations of the drawing, the thickness of the material and the size of the ribs are exaggerated for the sake of clearness.

To accomplish the objects of this invention, the Depthograph lineating screen should have at least two adjacent sheets of material, one preferably rigid, and the other may be of a relatively thin plastic material with lenticulations thereon, and these are preferably cemented together.

As shown in the drawing, a sheet of glass or other rigid transparent material, designated 1, carries at its back surface a film 2 of suitable photographic emulsion, which is made up of picture strips of the character set forth in my prior Patents No. 1,150,374 and 1,260,682, and which strips are designated 3, being of the kind present in the usual Depthograph picture.

At the front of the rigid sheet 1 is a relatively thin sheet of ribbed transparent plastic material, such as cellulose ester or ether or synthetic resin or a mixture containing such substances, which sheet is designated generally by the numeral 4, and has lenticulated ribs on the front surface thereof which are designated 5. These materials are synthetic organic plastics, the cellulose esters and ethers being synthetic cellulose plastics. These materials have the advantage that they can be readily molded. In particular, with thermoplastics, as mentioned, while they are adequately rigid at ordinary temperatures, large permanent deformations can be produced readily by the application of stress at a suitable temperature above ordinary temperatures. The lenticulated sheet 4 is preferably attached to the rigid sheet 1 by a thin layer of transparent cement 6. Transparent cement, suitable for use in cementing a plastic material such as Celluloid or other cellulose plastic to glass, is already well-known in the art.

The lineating screen formed of the sheets 1 and 4 placed in juxtaposition, and preferably adhesively secured together, renders visible from a given direction only certain linear elements of the picture surface. Such lineating screens have other uses than the one just described, such as are referred to in my Patents No. 1,882,648, granted October 11, 1932, and No. 1,935,471, granted November 14, 1933. While the lenticulated surface usually carries vertical ribs, if desired it may have a pebbled form, or other desired form, as shown in Patent No. 1,935,471, granted November 14, 1933.

If desired, a binding 7 may be employed around the edges of the complete Depthograph, although this is not essential. This binding may consist of tape, metal or other material, or it may be formed by dipping the edges of the Depthograph in lacquer or cement.

In the manufacture of my device, my usual procedure is to employ as the rigid support 1 a glass photographic plate on which the emulsion is represented at 2, and to print photographically a Depthograph picture on this plate, and after its development to cement the ribbed sheet 4 to the opposite side of the plate with the ribs or lenticulations of the sheet 4 in registration with the picture strips. A Depthograph thus produced is transparent and is adapted for exhibition by transmitted light.

Figure 2:
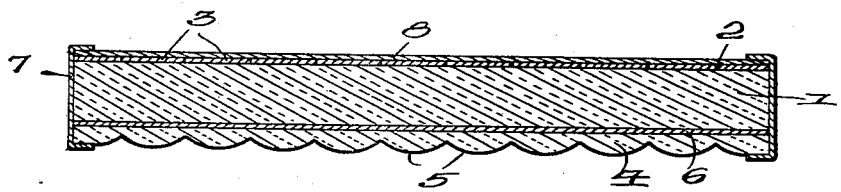
Fig. 2 is a similar view sutiable for viewing by reflected light.

A Depthograph suitable for viewing by reflected light, instead of by transmitted light, is shown in Fig. 2. This is similar to that shown in Fig. 1, except that the picture medium 2 is backed by a layer of reflecting material 8. For this purpose, I prefer to use white paint, but other materials may be used as desired, such as light colored paint, paper, reflecting metal, etc.

Figure 3:
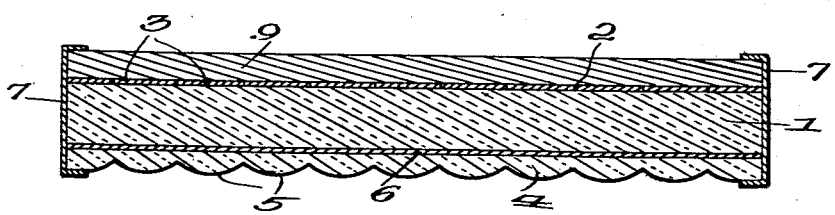
Fig. 3 shows another form of my invention in which the picture medium is carried on a separate support other than the rigid transparent sheet.

Fig. 3 shows another form of my invention, in which instead of the picture medium being carried directly by the rigid plate or sheet 1, it is carried by a supporting sheet 9 of paper, glass or other material, and is placed adjacent the sheet 1 or cemented to it by a transparent or translucent cement. In this embodiment of the invention the composite screen has the important advantage that once the sheet 4, in which the lenticulations are formed, is cemented or otherwise securely affixed to the supporting sheet 1 no subsequent shrinkage or distortion of the sheet 4 can take place. This greatly facilitates initially accurately registering the lenticulations with the image on the separate supporting sheet 9, since only change of dimensions of the latter need then be guarded against, and also maintaining the registration during use. It is preferable to cement the supporting sheet 9 to the plate 1, because the use of cement is likely to produce a clearer picture than merely holding the picture medium adjacent the plate 1. In this form the binding 7 preferably embraces the supporting sheet 9.

It will be understood that in some cases the sheet of ribbed material may be adhesively secured to the supporting plate without the use of a separate cementing material, depending on the type of organic plastic material employed, etc.

If desired, the picture may be produced photographically on the picture medium 2, or by printing with a press, or by other methods.

The combined thickness of the rigid sheet 1 and ribbed sheet 4 is such as to dispose the picture strips approximately in the focal plane of the lenses formed by the ribs or other lenticulations 5.

I claim:

1. In the production of a picture for viewing in stereoscopic relief, the improvement which comprises, printing on one surface of a sheet of transparent material a composite image of an object, said image having interlineated views of an object from different points of view, and subsequently affixing to the other surface of said sheet a sheet of lenticulated transparent material with the lenticulations in registry with the interlineated elements of the composite image.

2. In the production of a picture for viewing in stereoscopic relief, the improvement which comprises, photographically printing on one surface of a transparent sheet of glass a composite image of an object, said image having interlineated views of an object from different points of view, and subsequently rigidly securing to the other surface of said glass sheet a sheet of a transparent cellulosic material having image-forming lenticulations on the outer surface thereof, said lenticulations being registered with the interlineated elements of the composite image.

3. A picture assembly exhibiting stereoscopic relief comprising a supporting sheet of transparent glass, a sheet of a transparent synthetic organic plastic having image-forming lenticulations on one surface thereof, said lenticulated sheet being rigidly affixed to said supporting sheet in contiguous relation therewith in such a manner that the supporting sheet prevents subsequent shrinkage of the lenticulated sheet, and a composite image substantially in the focal plane of said lenticulations and having interlineated views of an object from different points of view positioned in registered cooperative relationship with the lenticulations of said lenticulated sheet.

4. A picture assembly exhibiting stereoscopic relief comprising a supporting sheet of transparent glass, a sheet of a transparent organic plastic having image-forming lenticulations on one surface thereof, the non-lenticulated surface of said lenticulated sheet being rigidly cemented to said supporting sheet of glass, and a composite image having interlineated stereoscopically related views of an object from different points of view carried by a second supporting sheet of material, said second supporting sheet being so positioned that the elements of the composite image are in registered cooperative relationship with the lenticulations of said lenticulated sheet.

5. A picture assembly exhibiting stereoscopic relief and adapted to be viewed by reflected light which comprises a supporting sheet of transparent glass, a relatively thin sheet of a transparent synthetic organic plastic rigidly secured to said supporting sheet of glass, said sheet of organic plastic having image-forming lenticulations on the surface thereof away from said supporting sheet of glass, said lenticulations having a focus substantially at the rear surface of said sheet of glass, and a composite image having interlineated stereoscopically related views of an object from different points of view carried on a sheet of paper, said image on paper being positioned at the rear surface of said supporting sheet of glass in registered cooperative relationship with the said lenticulations.

6. In the production of a picture for viewing in stereoscopic relief, the improvement which comprises photographically printing on one surface of a transparent support sheet of glass having a light sensitive coating thereon, a composite image of an object, said image having interlineated views of an object from different points of view, and subsequently rigidly cementing to the other surface of said glass sheet a thin sheet of a transparent organic plastic having image-forming lenticulations on the outer surface thereof, said lenticulations being registered with the interlineated elements of the composite image.

7. A picture assembly exhibiting stereoscopic relief comprising a thin sheet of a transparent synthetic organic plastic having a series of image-forming lenticulations on one surface thereof, a sheet of transparent glass as a rigid support therefor, the non-lenticulated surface of said lenticulated sheet being rigidly cemented to said glass sheet, and a separately-recorded composite image having interlineated stereoscopically related views of an object from different points of view carried on a second supporting sheet, said composite image being positioned and assembled in registered cooperative relationship with the said lenticulations, whereby a stereoscopic picture assembly having lenticulations of requisite quality accurately registered with the composite image may be obtained.

CLARENCE W. KANOLT.